United States Patent
Chen

(10) Patent No.: US 11,060,632 B2
(45) Date of Patent: Jul. 13, 2021

(54) SMART VALVE MAINTENANCE ALERT DEVICE

(71) Applicant: BION INC., New Taipei (TW)

(72) Inventor: Yu-Yu Chen, Taipei (TW)

(73) Assignee: Bion Inc., New Taipei (TW)

( * ) Notice: Subject to any disclaimer, the term of this patent is extended or adjusted under 35 U.S.C. 154(b) by 48 days.

(21) Appl. No.: 16/522,848

(22) Filed: Jul. 26, 2019

(65) Prior Publication Data

US 2020/0041034 A1    Feb. 6, 2020

(30) Foreign Application Priority Data

Aug. 1, 2018    (TW) .................................. 10712665.4

(51) Int. Cl.
*F16K 37/00* (2006.01)
*G05D 7/06* (2006.01)
*G08B 21/18* (2006.01)
*G01K 1/02* (2021.01)
*G01K 1/14* (2021.01)

(52) U.S. Cl.
CPC .......... *F16K 37/0041* (2013.01); *G01K 1/028* (2013.01); *G01K 1/14* (2013.01); *G05D 7/0635* (2013.01); *G08B 21/18* (2013.01); *Y10T 137/8242* (2015.04)

(58) Field of Classification Search
CPC ... G01K 1/14; F16K 37/0041; F16K 37/0033; F16K 37/005; Y10T 137/8242; G05D 7/0635
See application file for complete search history.

(56) References Cited

U.S. PATENT DOCUMENTS

| | | | |
|---|---|---|---|
| 6,267,139 B1* | 7/2001 | Miklo ..................... | F16K 27/02 137/554 |
| 2013/0153798 A1* | 6/2013 | Kucera ................... | F23N 1/002 251/129.01 |
| 2014/0238512 A1* | 8/2014 | Bowers ............... | F16K 37/0041 137/554 |
| 2016/0169410 A1* | 6/2016 | Wheeler ............ | G05B 23/0205 137/1 |
| 2018/0136673 A1* | 5/2018 | Halimi ................. | G05D 7/0635 |

* cited by examiner

*Primary Examiner* — Atif H Chaudry
(74) *Attorney, Agent, or Firm* — Rosenberg, Klein & Lee

(57) ABSTRACT

A smart valve maintenance alert device includes a connection unit, which is connectable to a valve stem of a smart valve. The connection unit includes a detectable element that is movable in unison with the valve stem. A control unit includes a detecting element arranged to correspond to the detectable element. A drive unit is connected to the connection unit, and the drive unit drives the connection unit to allow the valve stem to be driven by the connection unit to rotate and the valve stem drives the smart valve to rotate. The detecting element and the detectable element collaboratively generate a detection signal in response to the rotation of the valve stem, such that the control unit generates data of operation state according to the detection signal.

8 Claims, 7 Drawing Sheets

SMART VALVE MAINTENANCE ALERT DEVICE

BACKGROUND OF THE INVENTION

1. Field of the Invention

The present invention relates to a maintenance alert device, and in particular to a maintenance alert device for smart valves.

2. The Related Arts

A valve is a mechanical device that controls flow rate, flowing direction, pressure and temperature, and the likes of a flowing fluid medium. For example, a flow control valve is a common mechanical device that often includes a valve body and a valve seat. The valve body has two opposite ends that are respectively formed with a fluid inlet port and a fluid outlet port and the valve seat is arranged between the fluid inlet port and the fluid outlet port. By adjusting a position of the valve seat between the fluid inlet port and the fluid outlet port, it is possible to completely isolate the fluid inlet port and the fluid outlet port from each other, or to regulate the flow rate from the fluid inlet port to the fluid outlet port.

For example, as shown in FIG. 1, which is a schematic view showing a known ball control valve, the known ball control valve, generally designated at 1, is manually controlled by rotating a handwheel 110 in the clockwise direction or the counterclockwise direction. The handwheel 110 is connected to an end of a valve stem 111. The valve stem 111 has an opposite end that is connected to the valve seat 112 so that the valve seat 112 is rotatable in unison with the handwheel 110 to control the flow rate between the fluid inlet portion 12 and the fluid outlet port 13 of the control valve body 14 or to completely isolate the fluid inlet port 12 and the fluid outlet port 13 from each other to show a closed state. Further, manufacturers provide means for controlling opening and closing of a valve by using an electronic device. China Utility Model CN203548977U discloses a two-way ball valve that features high accuracy of controlling flow rate of pressurized natural gas and functions to measure flow rate through the valve, in addition to controlling opening and closing of the valve.

However, after a long-term service of the ball control valve 1, components of the ball control valve 1 may suffer wear and abrasion of different extents, and may eventually lead to function failure. Among the components, handwheel 110 and the valve seat 112 are two of the components that are most susceptible to failure. One of the most commonly adopted ways for inspecting if the ball control valve 1 is functionally normal is to record the turns of rotation of the handwheel 110. However, human memory is not reliable in keeping the record; making such records with pens and note papers may not accurately or effectively record the turns of rotation of the handwheel 110. And, this makes it impossible for maintenance operators to correctly realize the state of the ball control valve 1 or to correctly predict whether the ball control valve 1 may functionally fail in a short period of time. Thus, it is possible to identify the failure of the ball control valve 1 only when the valve seat 112 does not effectively isolate the fluid inlet port 12 and the fluid outlet port 13 from each other and continuous leaking is observed. Unrecoverable damage may be already caused at this moment. Further, China Utility Model CN205317464U provides a natural gas high-pressure ball valve service life testing device, which is provided for determining the life span of a valve. Such a device, however, is generally not available for field installation in a site where pipelines are arranged.

Further, Watts Water Technologies, Inc., Massachusetts, USA, provides an electronic actuator, model VALPES, which is connectable to a ball valve and an application program Axmart is provided for being installed in a smart phone to control opening and closing of the valve and to record the operation time of the electronic actuator. However, no recording of the number of opening/closing of the valve is available.

Thus, it is still an issue to be addressed to provide a smart valve maintenance alert device that allows a maintenance operator to identify, in advance, an operation state of a valve, such as the number of opening/closing of the valve, in order to make necessary replacement before the valve fails and thus reducing unnecessary damage and loss.

SUMMARY OF THE INVENTION

In view of the drawbacks of the prior art, an objective of the present invention is to provide a solution for calculating and recording an operation state of a valve in order to overcome the problem that a conventional valve does not allow for determining an operation state thereof in advance.

According to the objective of the present invention, the present invention relates to a smart valve maintenance alert device, wherein the valve at least comprises a valve body, a valve stem, and a valve seat, wherein the valve body is mounted among pipelines of a fluid piping system; the valve seat is arranged in an interior of the valve body; and the valve stem has an end extending into the valve body to connect to the valve seat and an opposite end extending outside the valve body to allow the valve stem to drive the valve seat to rotate and wherein an operation state recording device comprises a connection unit, a control unit, and a drive unit, wherein the connection unit is connected to the valve stem; the connection unit is provided with a detectable element that is movable in unison with the valve stem; the control unit is provided with a detecting element, such that when the drive unit is in operation, the drive unit drives the connection unit to have the valve stem driven to rotate by the connection unit and thus, the valve stem drives the valve seat to rotate, wherein under such a condition, the detecting element and the detectable element collaboratively detect the rotation of the valve stem to generate a detection signal, and the control unit generates data of operation state according to the detection signal.

Such a device may further comprise a power supply unit, and the power supply unit is connected to the control unit to supply electrical power to the control unit.

In such a device, the control unit comprises an operation module and a transmission module, wherein the operation module is connected to the detecting element to calculate data of operation state of the smart valve according to the detection signal; the transmission module is connected to the operation module to allow the data of operation state to transmit to the outside through the transmission module.

In such a device, the control unit further comprises a temperature detection unit, and the temperature detection unit is connected to the operation module, wherein the temperature detection unit detects a temperature of fluid in an interior of a valve body to generate a temperature signal, and the operation module calculates a temperature value according to the temperature signal. Then, the transmission module transmits the temperature value to the outside.

In such a device, the control unit further comprises an output unit, and the output unit is connected to the operation module, wherein the output unit receives and outputs the data of operation state and the temperature value.

Based on the above, the present invention provides one or more advantages provided below:

(1) A user may use the output unit to read, at a near site, the data of operation state and identifies a current state of operation of the valve by means of the data of operation state.

(2) A user may use an external device to read, at a remote site, the data of operation state and identifies a current state of operation of the valve by means of the data of operation state.

(3) The data of operation state may include the number of turns that the valve seat has been rotated, the position of the valve seat, and flow rate, and a user may determine if the valve is normal or abnormal according to the data of operation state so that instantaneous maintenance or repairing may be conducted.

DETAILED DESCRIPTION OF THE PREFERRED EMBODIMENTS

Figure 1:
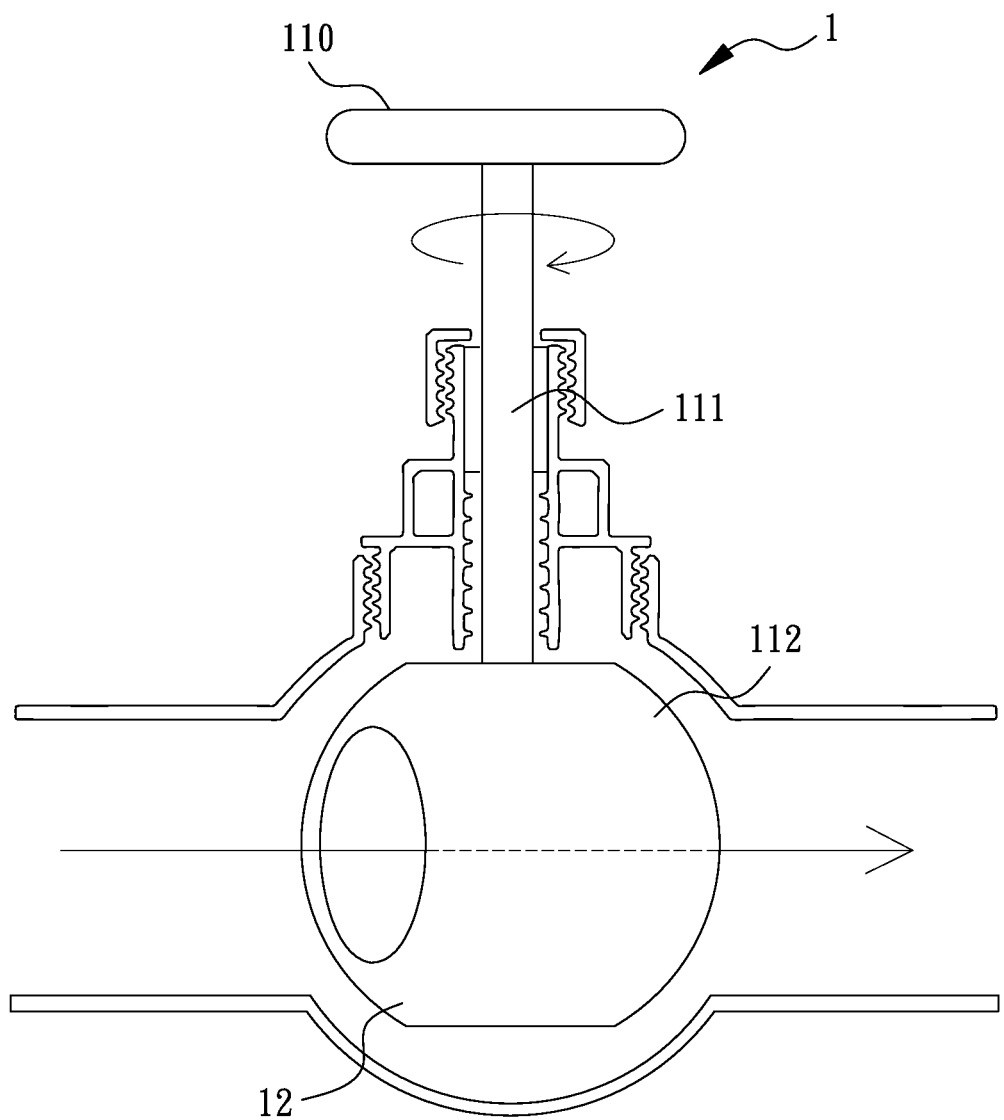
FIG. 1 is a schematic view showing a known ball control valve.
Figure 2:
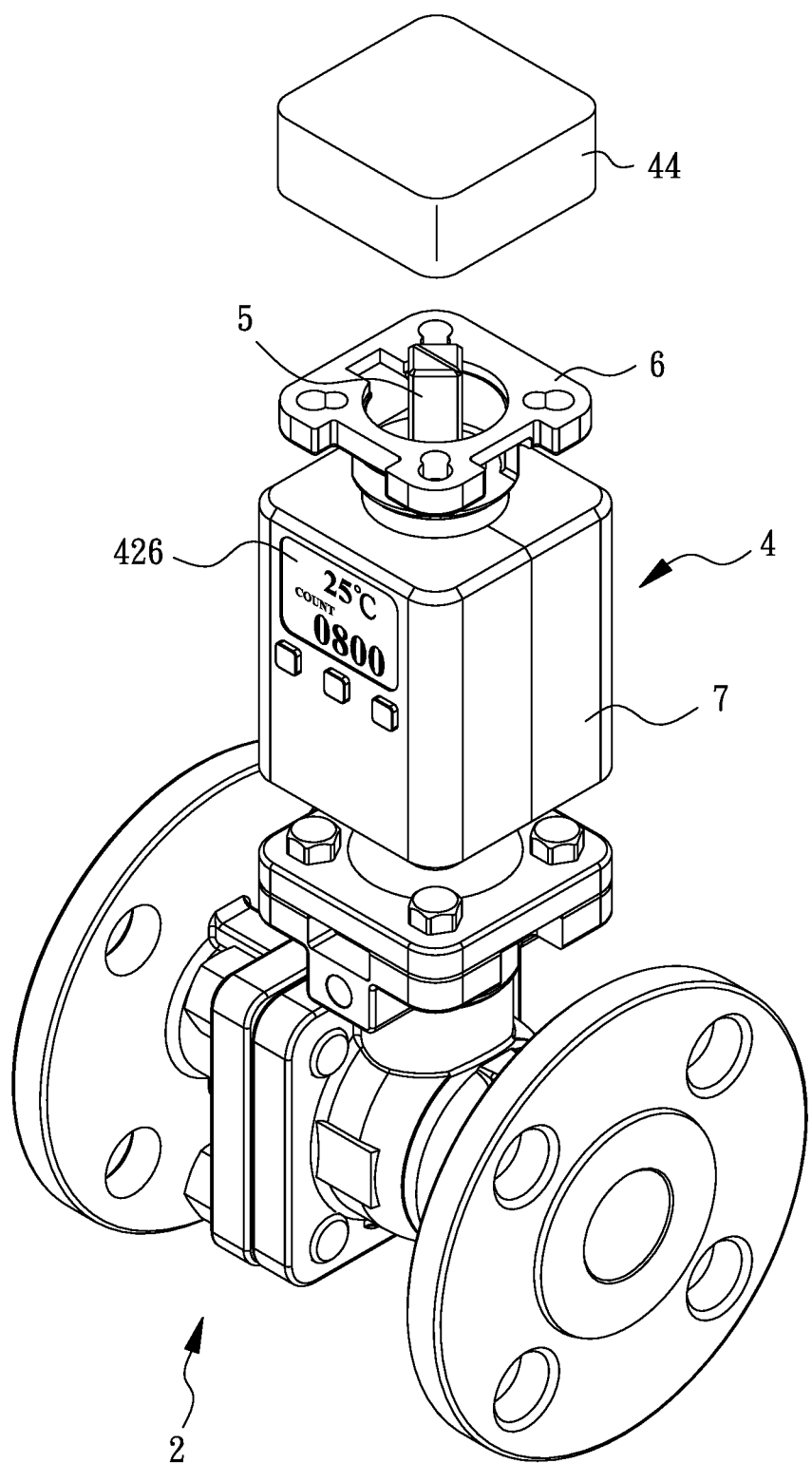
FIG. 2 is a perspective view showing a smart valve maintenance alert device according to an embodiment of the present invention.

A detailed description of the present invention will be provided below with reference to the attached drawings and embodiments of the present invention for better understanding of the purposes, technical solution, and advantages of the present invention. It is, however, understandable that the embodiments described herein are provided only for illustration and explanation of the present invention and are not intended to limit the present invention. Further illustration will be provided below with reference to the drawings:

Referring to FIGS. 2-6, the present invention provides a maintenance alert device for use with a smart valve, wherein the valve, generally designated at 2, is a valve that is mounted on a pipeline of a fluid piping system to control flow rate of a fluid flowing in the pipeline. Generally speaking, the valve 2 comprises at least a valve body 20, a valve seat 22, and a valve stem 24, wherein the valve body 20 is mounted to the pipeline; the valve seat 22 is arranged in an interior of the valve body 20; and the valve stem 24 has an end extending into the interior of the valve body 20 to connect to the valve seat 22 and an opposite end of the valve stem 24 extends to the outside of the valve body 20, so that the valve stem 24 is operable to drive the valve seat 22 to rotate for controlling and regulating the flow rate at an outlet of the valve body 20.

In this invention, the maintenance alert device, generally designated at 4, comprises a connection unit 40, a control unit 42, and a drive unit 44. The connection unit 40 is connected to the valve stem 24, and the connection unit 40 comprises a detectable element 400 that is movable in unison with the valve stem 24. The control unit 42 comprises a detecting element 420. When the drive unit 44 is in operation, the drive unit 44 drives the connection unit 40, so that the valve stem 24 is rotated by the connection unit 40 to allow the valve stem 24 to drive the valve seat 22 to rotate. Under such a condition, the detecting element 420 and the detectable element 400 make detection therebetween in respect of variation caused by the rotation of the valve stem 24 so as to generate a detection signal. The control unit 42 generates data of an operation state of the valve 2 according to the detection signal. The maintenance alert device 4 further comprises a power supply unit 421. The power supply unit 421 is connected to the control unit 42 to supply electrical power to the control unit 42.

Figure 3A:
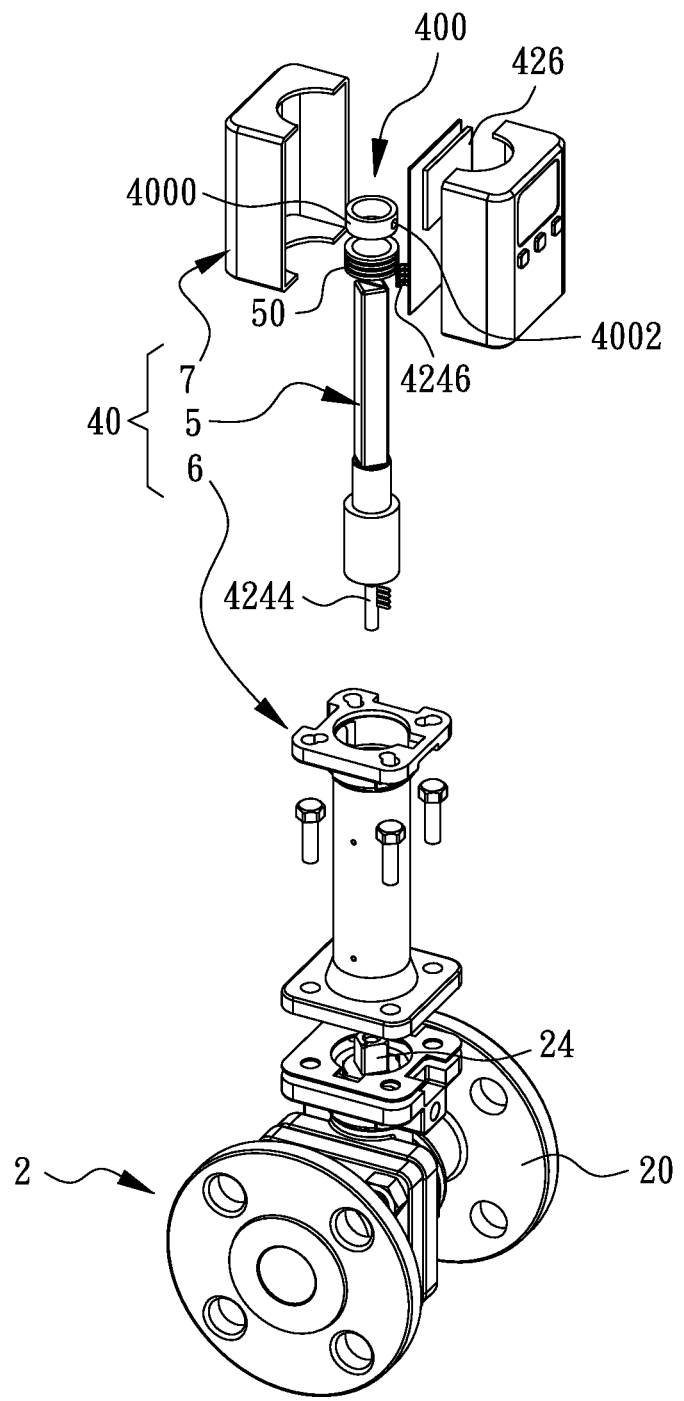
FIG. 3A is an exploded view of FIG. 2, showing components detached from each other.
Figure 3B:
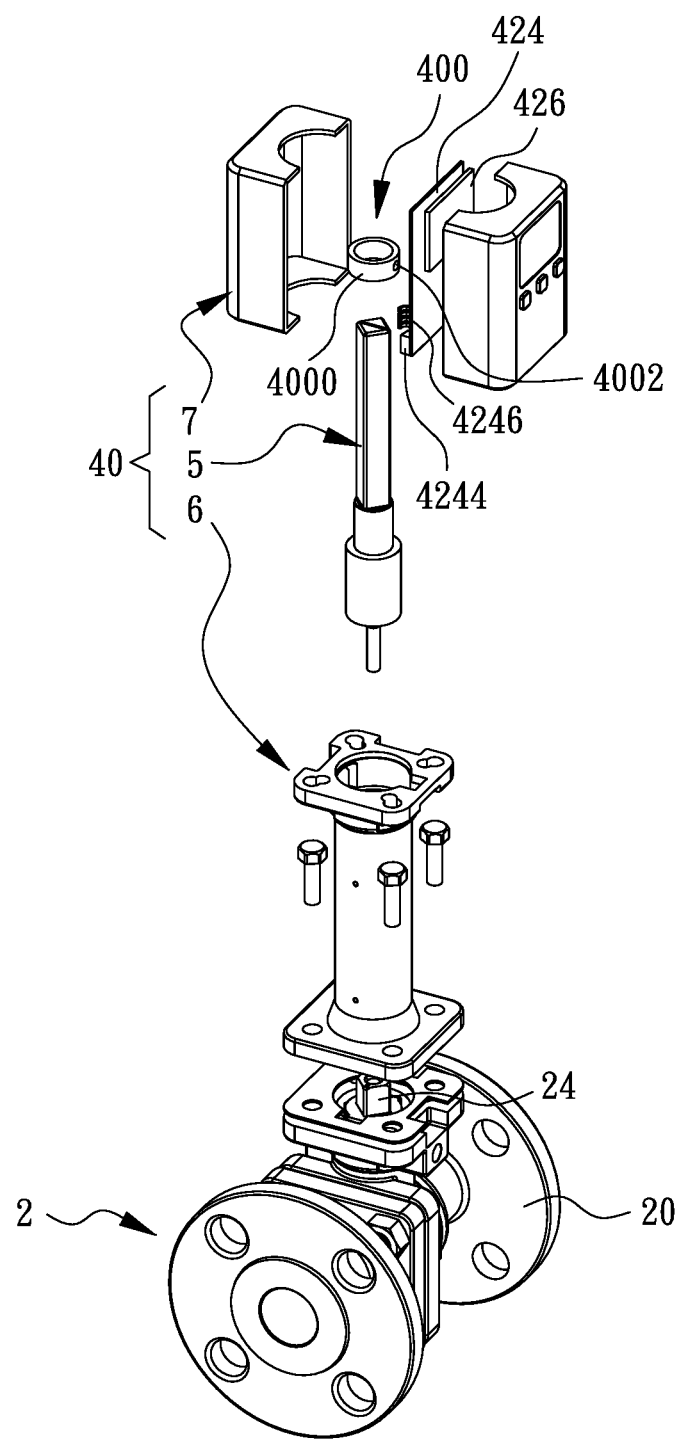
FIG. 3B is an exploded view of FIG. 2, showing components detached from each other according to another embodiment.
Figure 4:
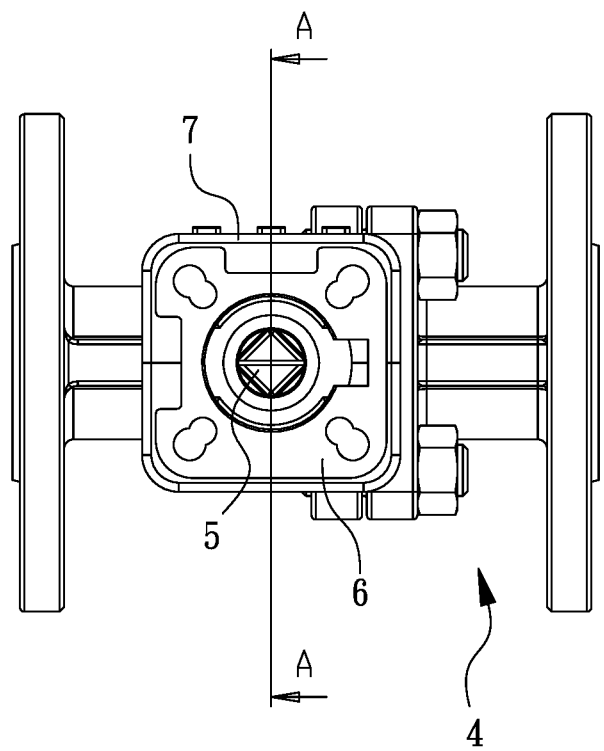
FIG. 4 is a top plan view of FIG. 2 in an assembled form.
Figure 5:
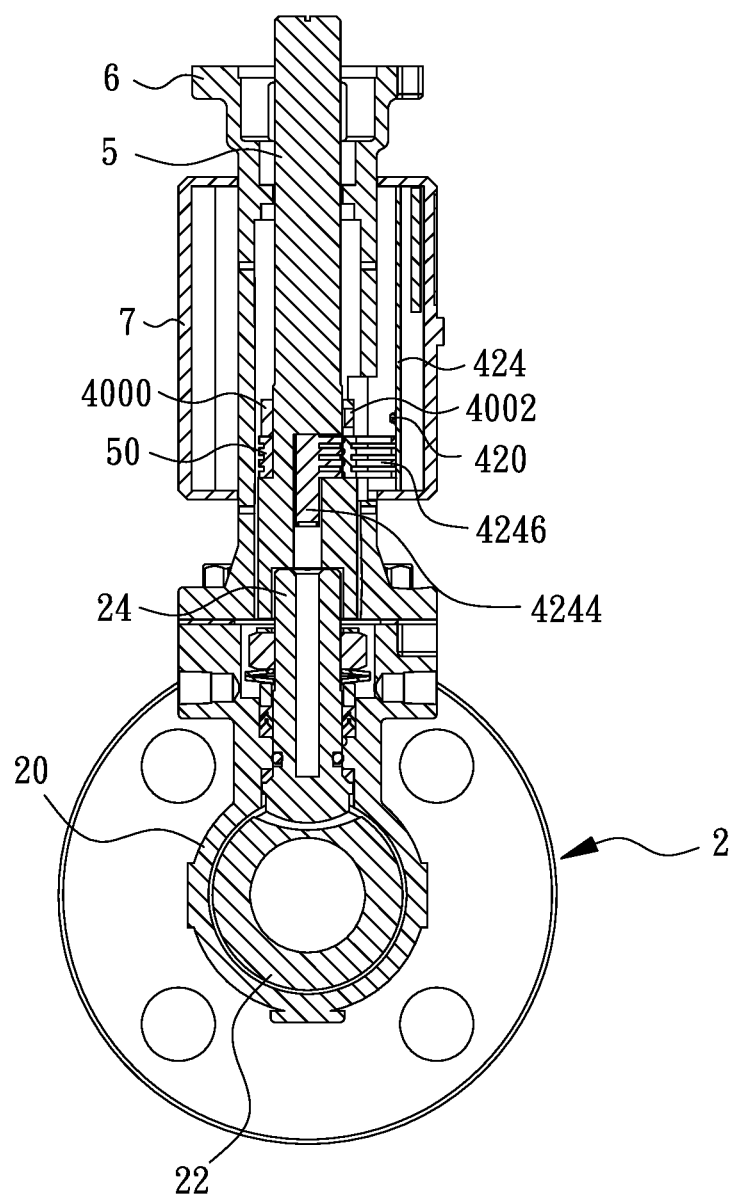
FIG. 5 is a cross-sectional view of FIG. 4.

In an embodiment of the present invention, as shown in FIG. 3A, the connection unit 40 comprises a connection rod 5, a connection seat 6 (which is made of a non-magnetic material or a combination of a non-magnetic material and a magnetic material), and a casing 7, wherein the connection rod 5 has an end connected to the valve stem 24, and the connection rod 5 is provided, in an interior thereof at a location adjacent to the valve stem 24, with a temperature detection unit 4244 (such as infrared temperature sensor that projects light to the valve body 20, or a temperature resistance sensing device that has a temperature resistor in contact with the valve body 20), so that the temperature detection unit 4244 detects a temperature of the connection rod 5. A temperature of a fluid flowing through the valve body 20 is transmitted to the connection rod 5, so that the temperature detection unit 4244 that detects the temperature of the connection rod 5 is generally equivalent to detecting the temperature of the fluid flowing through the valve body 20. Further, the temperature detection unit 4244 has electrical contact terminals that are exposed outside a surface of the connection rod 5. The surface of the connection rod 5 is provided, at a location corresponding to the temperature detection unit 4244, with a conductor ring 50. The detectable element 400 is arranged on the surface of the connection rod 5 at a location adjacent to the conductor ring 50. The detectable element 400 comprises an annular body 4000 and a magnetic body 4002 arranged on the annular body 4000. Alternatively, as shown in FIG. 3B, the temperature detection unit 4244 may be mounted on the connection unit 40 or a circuit board 424. The connection seat 6 is arranged on an outer circumference of the connection rod 5 and the connection seat 6 has an end connected to the valve body 20, while the opposite end of the connection rod 5 extends outside the connection seat 6 to connect to the drive unit 44. The drive unit 44 can be an actuator, a pneumatic control switch, or a hydraulic control switch. The casing 7 is arranged on a surface of the connection seat 6.

Figure 6:
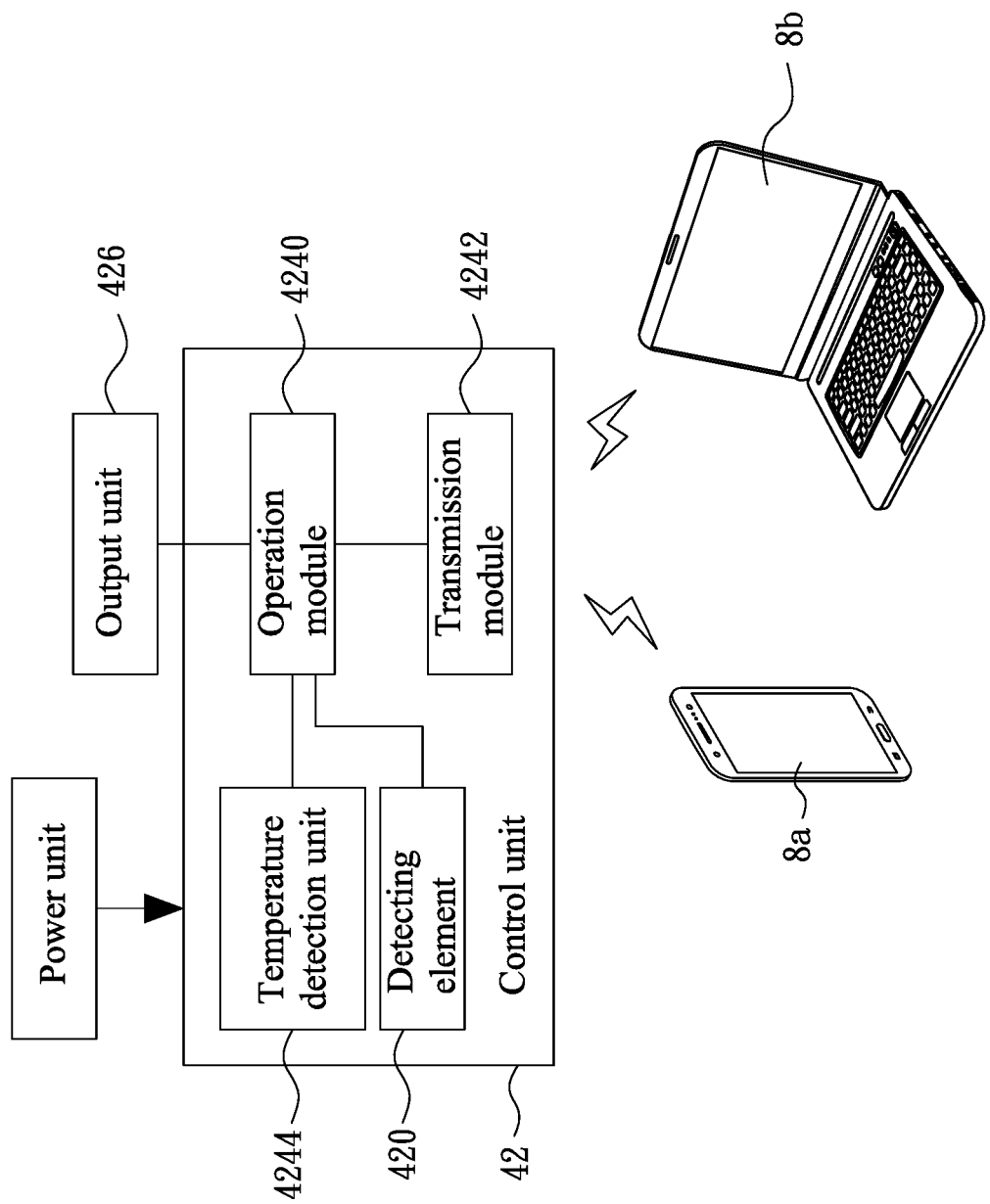
FIG. 6 shows a circuit block diagram according to an embodiment of the present invention.

Referring to FIG. 6, the control unit 42 is arranged in an interior of the casing 7. The control unit 42 comprises a circuit board 424 and an output unit 426. The detecting element 420 is mounted on the circuit board 424 at a location corresponding to the detectable element 400. The circuit board 424 is provided thereon with an operation module 4240, a transmission module 4242, and an electrical connection module 4246. The operation module 4240 is connected to the detecting element 420 to calculate and determine data of operation state of the connection unit 40 according to the detection signal. The transmission module 4242 is connected to the operation module 4240, so that the data of operation state is transmitted to the outside through the transmission module 4242. The electrical connection module 4246 is electrically connected to the conductor ring 50 to transmit electrical power necessary for the temperature detection unit 4244 and to transmit data of temperature. The output unit 426 is arranged on a surface of the casing 7. The output unit 426 is also connected to the operation module 4240, so that the output unit 426 may receive and output the data of the operation state and temperature. The output unit 426 can be visible light displaying device or a sound alarm device. The transmission module 4242 can be wireless transmission that transmits the data of operation state and temperature to a personal mobile device 8a, a wireless network transmitting/receiving device, a gateway, or cloud. The transmission module 4242 can alternatively be wired transmission that transmits the data of operation state and temperature to a personal mobile device, a computer 8b, or a network work station.

In the instant embodiment, the detecting element 420 comprises two or more than two Hall sensors or reed switch sensors. The detectable element 400 may comprise a magnet. Thus, when the connection rod 5 is rotated, the Hall sensors or reed switch sensors detect a variation of magnetic field that is converted into a variation of voltage, which serves as a basis on which the operation module 4240 is operated to calculate and determine the data of operation state. For example, the operation module 4240 may calculate various data of operation state, such as the number of turns that the valve seat 22 is rotated, the position of the valve seat 22, and flow rate, according to the variation of voltage, so that a user may determine if the valve 2 is normal or abnormal according to the data of operation state, and thus timely maintenance may be conducted.

In summary, when the drive unit 44 drives the connection unit 40 to rotate, the detectable unit 400 is caused to rotate relative to the detecting element 420, so that the detecting element 420 detects a variation of magnetic field and the control unit 42 generates data of operation state. A maintenance operator may observe the data of operation state by means of an external device or the output unit 426 and may thus conduct instantaneous or periodic operations of maintaining or repairing the valve, in order to avoid damage of the valve or components thereof due to for example metal fatigue occurring in the valve.

The above detailed description is provided with reference to certain embodiments of the present invention for the purposes of illustration and explanation. However, such embodiments are not intended to limit the scope of the present invention as claimed in the appended claims. Equivalents or modifications that are available in the spirits of the present invention should be considered falling in the scope of the present invention as defined in the appended claims. Further, the present invention is novel in inventive idea and also provides effectiveness that is not available in the prior art and thus completely meet the requirements for novelty and inventiveness.

What is claimed is:

1. A maintenance alert device for a smart valve including a valve body, a valve stem and a valve seat, comprising:
a drive unit;
a connection unit coupled to the valve stem of the smart valve and the drive unit, wherein the connection unit includes a detectable element movable in unison with the valve stem, the connection unit further including:
a connection rod having a first end connected to the valve stem, and the detectable element being provided on a surface of the connection rod;
a connection seat arranged along an outer circumference of the connection rod, the connection seat having an end connected to the valve body of the smart valve, the connection rod having a second opposing end extending outside the connection seat to connect to the drive unit; and
a casing arranged on a surface of the connection seat;
a control unit including a detecting element and a temperature detection unit, the control unit being arranged in an interior of the casing, the control unit further including:
a circuit board, the detecting element being arranged on the circuit board at a location corresponding to the detectable element, the circuit board being provided thereon with an operation module, a transmission module, and an electrical connection module, the operation module being connected to the detecting element for generating data of an operation state of the connection unit according to a detection signal, the transmission module being connected to the operation module, the data of the operation state of the connection unit is thereby transmitted through the transmission module, the electrical connection module is coupled to the temperature detection unit for transmitting electrical power to the temperature detection unit, the operation module also being connected to the temperature detection unit for generating a temperature value according to a temperature signal, and the transmission module thereby also transmits the temperature value; and
an output unit arranged on a surface of the casing, the output unit being connected to the operation module for receiving and to output the data of the operation state of the connection unit and the temperature value; and
wherein the drive unit drives the valve stem to rotate via the connection unit, and the valve stem thereby drives the valve seat of the smart valve to rotate;
wherein the detecting element generates the detection signal responsive to movement of the detectable element in in correspondence with rotation of the valve stem, and the operation module of the control unit thereby generates the data of the operation state of the connection unit according to the detection signal.

2. The maintenance alert device as claimed in claim 1, further comprising a power supply unit connected to the control unit to supply electrical power to the control unit.

3. The maintenance alert device as claimed in claim 1, wherein the temperature detection unit is mounted within the connection rod to detect temperature of a fluid in an interior of the valve body of the smart valve to generate the temperature signal, or the temperature detection unit is mounted on the circuit board of the control unit to detect an environment temperature for generating the temperature signal, and the transmission module transmits the temperature value to an external device.

4. The maintenance alert device as claimed in claim 1, wherein the output unit is either one of a visible light displaying device or a sound alarm device.

5. The maintenance alert device as claimed in claim 1, wherein the detecting element is either one of a Hall sensor or a reed switch sensor, and the detectable element includes a magnet.

6. The maintenance alert device as claimed in claim 1, wherein the transmission module wirelessly transmits the data of the operation state of the connection unit to one of a personal mobile device, a wireless network transmitting/receiving device, a gateway, and cloud.

7. The maintenance alert device as claimed in claim 1, wherein the transmission module transmits, through wired transmission, the data of the operation state of the connection unit to one of a personal mobile device, a computer, and a network work station.

8. The maintenance alert device as claimed in claim 1, wherein the temperature detection unit is mounted within the connection rod for generating the temperature signal, the electrical connection module is electrically connected to a conductor ring arranged on the connection rod for transmitting electrical power to the temperature detection unit.

\* \* \* \* \*